US011910148B2

(12) United States Patent
Wei

(10) Patent No.: US 11,910,148 B2
(45) Date of Patent: Feb. 20, 2024

(54) METHOD FOR DETERMINING CAPACITANCE REFERENCE, APPARATUS FOR DETERMINING CAPACITANCE REFERENCE, AND DEVICE

(71) Applicant: SHENZHEN GOODIX TECHNOLOGY CO., LTD., Shenzhen (CN)

(72) Inventor: Haijun Wei, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 230 days.

(21) Appl. No.: 17/496,428

(22) Filed: Oct. 7, 2021

(65) Prior Publication Data

US 2022/0256271 A1 Aug. 11, 2022

Related U.S. Application Data

(63) Continuation of application No. PCT/CN2021/076589, filed on Feb. 10, 2021.

(51) Int. Cl.
*H04R 1/10* (2006.01)

(52) U.S. Cl.
CPC ......... *H04R 1/1041* (2013.01); *H04R 1/1016* (2013.01); *H04R 2420/07* (2013.01); *H04R 2460/03* (2013.01)

(58) Field of Classification Search
CPC ........................... H04R 1/1041; H04R 1/1016; H04R 2420/07; H04R 2460/03; H03K 2217/960745
See application file for complete search history.

(56) References Cited

U.S. PATENT DOCUMENTS

| | | | | |
|---|---|---|---|---|
| 6,246,772 | B1 | 6/2001 | Chang | |
| 2007/0121959 | A1 | 5/2007 | Philipp | |
| 2019/0265836 | A1 * | 8/2019 | Tanuma | G06F 3/044 |

(Continued)

FOREIGN PATENT DOCUMENTS

| | | | |
|---|---|---|---|
| CN | 101078774 | A | 11/2007 |
| CN | 102968217 | | 3/2013 |

(Continued)

*Primary Examiner* — Sunita Joshi
(74) *Attorney, Agent, or Firm* — Emerson, Thomson, & Bennett, LLC; Roger D. Emerson; Matt J. Wilson

(57) ABSTRACT

A method for determining a capacitance reference, an apparatus for determining a capacitance reference, and a device are provided. The method is applied to a device with double-layer capacitive sensors, and the method comprises: obtaining a first differential capacitance value of the double-layer capacitive sensors, the first differential capacitance value being a minimum differential capacitance value obtained when the device is out of a box, and the box being a matching device paired with the device and used to receive the device; and determining a latest differential capacitance reference value according to the first differential capacitance value and a differential capacitance reference value. By tracking and updating the differential capacitance reference value, a more accurate capacitance reference is provided to ensure the accuracy of capacitance change detection, and then to ensure the accuracy of detection on the behavior state of the device.

20 Claims, 8 Drawing Sheets

(56) References Cited

U.S. PATENT DOCUMENTS

| | | | | |
|---|---|---|---|---|
| 2020/0100010 | A1 | 3/2020 | Yang et al. | |
| 2020/0314527 | A1 | 10/2020 | Guo et al. | |
| 2020/0371144 | A1 | 11/2020 | Seo et al. | |
| 2021/0342032 | A1 * | 11/2021 | Guo | H04R 1/1041 |

FOREIGN PATENT DOCUMENTS

| | | | | |
|---|---|---|---|---|
| CN | 103430032 | | 12/2013 | |
| CN | 105487899 | | 4/2016 | |
| CN | 110099325 | | 8/2019 | |
| CN | 110099325 | A * | 8/2019 | H04R 1/1041 |
| CN | 110114738 | | 8/2019 | |
| CN | WO2020155102 | A1 | 8/2020 | |
| CN | 111707295 | A | 9/2020 | |
| CN | 111813276 | A | 10/2020 | |
| CN | 111970603 | | 11/2020 | |
| JP | 2005286734 | A | 10/2005 | |
| KR | 1020070037424 | A | 4/2007 | |
| KR | 1020070114063 | A | 11/2007 | |
| KR | 1020140026363 | A | 3/2014 | |
| KR | 1020210002610 | A | 1/2021 | |

* cited by examiner

METHOD FOR DETERMINING CAPACITANCE REFERENCE, APPARATUS FOR DETERMINING CAPACITANCE REFERENCE, AND DEVICE

CROSS-REFERENCE TO RELATED APPLICATION

This disclosure is a continuation of International Application No. PCT/CN2021/076589, filed on Feb. 10, 2021, which is hereby incorporated by reference in its entirety.

TECHNICAL FIELD

Embodiments of the present application relate to the field of capacitance detection, and more specifically, to a method for determining a capacitance reference, an apparatus for determining a capacitance reference, and a device.

BACKGROUND

Electronic devices are often equipped with various capacitive sensors to achieve controls and applications through detected capacitance signals, for example, approaching detection, pressure detection, etc. based on the change in detected capacitance signals. For another example, the capacitive approaching detection can determine whether an earphone is in user's ear, and then control whether to pause music playback of the earphone; and the capacitive pressure detection can determine whether the user clicks the earphone based on the change of capacitance, and then control whether to hang up the call on the earphone or whether to enable a noise reduction function. In order to improve user's interactive experience, True Wireless Stereo (TWS) headphones or hearing aids, smart watches, smart phones, etc. are equipped with various capacitive sensors. For example, a capacitive sensor can be disposed in an earphone or hearing aid to detect the change of capacitance and detect whether the earphone or hearing aid is close to the ear so as to determine a wearing state. Alternatively, other behavior states of the devices equipped with capacitive sensors can also be detected through the change of capacitance. Taking the earphone as an example here, the corresponding capacitance change can be detected according to the sensor configured in the earphone, and the current state of the earphone can be determined according to the detected capacitance change. The premise of this solution is that the capacitance reference value must be stable and accurate. However, in actual application scenarios, the capacitance reference value of the earphone will change. For example, when the material of the earphone shell and the sensor are aging, because the earphone falls or the climate changes, the actual capacitance reference value changes. This change will affect the result of capacitance detection. More specifically, it will affect the detection result of capacitance change, and then lead to the inaccuracy of detection based on capacitance change (such as wearing detection) and subsequent control.

SUMMARY

Embodiments of the present application provide a method for determining a capacitance reference, an apparatus for determining a capacitance reference, and a device. The method and the apparatus can track a differential capacitance reference value of sensors during the use of a device equipped with double-layer capacitive sensors, so as to provide a more accurate capacitance reference and then solve the above technical problems.

In a first aspect, a method for determining a capacitance reference is provided, applied to a device with double-layer capacitive sensors, the method including: obtaining a first differential capacitance value of the double-layer capacitive sensors, the first differential capacitance value being a minimum differential capacitance value obtained when the device is out of a box, and the box being a matching device paired with the device and used to receive the device; and determining a latest differential capacitance reference value according to the first differential capacitance value and a differential capacitance reference value.

When the wearing status of the earphone is determined through the detected differential capacitance value of the double-layer capacitive sensors and the differential capacitance reference value, the differential capacitance reference value may slowly change due to the aging of earphone materials or sensors, or the earphone drop or climate change, which in turn leads to inaccurate determination of the wearing state. In this embodiment, the minimum differential capacitance value of the earphone out of the box is obtained, and the minimum value is compared with the differential capacitance reference value to determine the latest differential capacitance reference value, thereby ensuring that the differential capacitance reference value can be calibrated and updated according to the actual change, and then ensuring the accuracy of wearing detection.

It should be understood that, the box in the embodiment of the present application is used with the device equipped with double-layer capacitive sensors in the embodiment of the present application. For example, when the device is an earphone, the box may be an earphone box matching the earphone.

The differential capacitance reference value may be a reference value obtained when no external conductor approaches the earphone, for example, the value may be a differential capacitance value obtained from the earphone in an idle state (that is, no external conductor approaches) before delivery, or a differential capacitance reference value after calibration during the use of the earphone.

In the following description of the beneficial effects of the determining method and apparatus in the embodiments of the present application, the device is an earphone as an example, and the approaching detection of the device is represented as the detection of a wearing state of the earphone as an example, but the present application is not limited thereto.

In a possible implementation, the method further includes: obtaining a second differential capacitance value of the double-layer capacitive sensors when the device is in the box, and determining whether the device is abnormal according to the second differential capacitance value and the first differential capacitance value; and when it is determined that the device is not abnormal, determining the latest differential capacitance reference value by a preset calibration method according to the first differential capacitance value and the differential capacitance reference value.

It should be understood that, the first differential capacitance value obtained in the embodiment of the present application should be a minimum capacitance value under normal circumstances, because after the device is moved from a state out of the box to a state inside the box, the device cannot be always close to the conductor; once the device is far away from the conductor, a relatively small differential capacitance value will be generated; at this time, it is assumed that the minimum value only includes the differential capacitance reference value, but the differential capacitance value obtained from the device in the box includes not only the reference value but also a capacitance signal change value caused by the box; therefore, whether the first differential capacitance reference value currently obtained out of the box is abnormal can be determined by comparing the obtained first differential capacitance value with the differential capacitance obtained in the box, for example, it can be determined that the device is currently in an abnormal state when the first differential capacitance value is greater than the differential capacitance obtained in the box, and because the device is abnormal, the differential capacitance reference value of the device will not be calibrated, and the latest differential capacitance reference value does not need to be re-determined.

Before the latest differential capacitance reference value is determined, the currently obtained differential capacitance value is determined through the second differential capacitance value obtained in the box. When it is determined that the currently obtained differential capacitance value is not abnormal, whether to calibrate the differential capacitance reference value is then determined, which can further improve the accuracy of calibration and avoid unnecessary calibration and updating of the differential capacitance reference value.

The second differential capacitance value may include a capacitance signal caused by the earphone box and the differential capacitance reference value.

In a possible implementation, the first differential capacitance value is a minimum differential capacitance value obtained within a time before the device is in the box.

Specifically, after the minimum differential capacitance value of the earphone out of the box is obtained, the process of determining the latest differential capacitance reference value may be carried out in the earphone box. At this time, the first differential capacitance value may be obtained within a time when the earphone is taken out of the earphone box and then put into the earphone box again. During this period, real-time differential capacitance values of the double-layer capacitive sensors may be collected according to a predetermined time period, and the minimum differential capacitance value within this period is determined as the first differential capacitance value.

In a possible implementation, the determining whether the device is abnormal according to the second differential capacitance value and the first differential capacitance value includes: when the first differential capacitance value is less than or equal to the second differential capacitance value, determining that the device is not abnormal; or, when the first differential capacitance value is greater than the second differential capacitance value, determining that the device is abnormal.

In a possible implementation, the determining a latest differential capacitance reference value according to the first differential capacitance value and a differential capacitance reference value includes: when the device is out of the box and an ear, determining, according to the first differential capacitance value and the differential capacitance reference value, whether the differential capacitance reference value needs to be calibrated; if the differential capacitance reference value needs to be calibrated, using the differential capacitance reference value calibrated by the preset calibration method as the latest differential capacitance reference value; or if the differential capacitance reference value does not need to be calibrated, using the differential capacitance reference value as the latest differential capacitance reference value.

Optionally, the process of determining the differential capacitance reference value may also be performed out of the earphone box. As such, the differential capacitance reference value can be calibrated and updated in time to ensure the accuracy of the differential capacitance reference value, thereby ensuring the accuracy of determination of the wearing result.

Specifically, after the minimum differential capacitance value of the earphone out of the box is obtained, the process of determining the latest differential capacitance reference value may be performed out of the earphone box. As such, the first differential capacitance value is a minimum differential capacitance value obtained when the earphone is out of the earphone box and the ear. It should be understood that, when the earphone is out of the earphone box, the earphone may be in the ear or out of the ear. When the earphone is in the ear, the detected first differential capacitance value includes a capacitance caused by the human body, so it is meaningless to calibrate and update the earphone. Therefore, the earphone in the ear should also be determined when whether the differential capacitance reference value needs to be calibrated is determined out of the earphone box, and when the latest differential capacitance reference value is determined.

Specifically, the first differential capacitance value may be based on a preset time period, such as 10 min or 20 min, a real-time differential capacitance value of the double-layer capacitive sensors is obtained according to a sampling time period, such as every 1 s, and then a minimum differential capacitance value is obtained according to the obtained real-time differential capacitance values within the time period.

In a possible implementation, the determining the latest differential capacitance reference value according to the first differential capacitance value and the differential capacitance reference value includes: when the absolute value of the difference between the first differential capacitance value and the differential capacitance reference value is greater than a preset first threshold, determining to calibrate the differential capacitance reference value; or, when the absolute value of the difference between the first differential capacitance value and the differential capacitance reference value is less than or equal to the preset first threshold, determining not to calibrate the differential capacitance reference value, the first threshold being used to indicate that the double-layer capacitive sensors are in an abnormal state.

By comparing with the preset first threshold, when the absolute value of the above difference is less than or equal to the first threshold, it is determined not to calibrate the differential capacitance reference value, which can avoid unnecessary calibration and reduce influence on normal operation of the earphone.

The threshold may be obtained based on experience, for example, the threshold may be 10, 20, etc.

In a possible implementation, the preset calibration method includes: if the first differential capacitance value is greater than the differential capacitance reference value, determining the calibrated differential capacitance reference value as: $c(ref)_{calibrated}=c(ref)+(c(min)-c(ref))*k_1$; or, if the first differential capacitance value is less than the differential capacitance reference value, determining the calibrated differential capacitance reference value as: $c(ref)_{calibrated}=c(ref)+(c(min)—c(ref))*k_2$, where c(ref) is the differential capacitance reference value, $c(ref)_{calibrated}$ is an the calibrated differential capacitance reference value, c(min) is the first differential capacitance value, $k_1$ and $k_2$ are calibration coefficients, $k_1$ is greater than or equal to 0 and less than 1, and $k_2$ is greater than or equal to 0 and less than 1.

By selecting different calibration coefficients, the earphone can obtain different calibration values in different situations, thereby ensuring the accuracy of the differential capacitance reference value, and then ensuring the accuracy of wearing state detection of the earphone. Specifically, software may determine to select which K value according to the relationship between c(min) and c(ref). When the difference between c(min) and c(ref) is relatively large, the self-learning is relatively fast, that is, the present application can be embodied by different K, and can better adaptively adjust the reference by selecting different K values.

The $k_1$ and $k_2$ are greater than or equal to 0 and less than 1. According to the relationship between the first differential capacitance value and the differential capacitance reference value, different calibration coefficients are selected to calibrate the differential capacitance reference value in different situations, thereby ensuring the accuracy of the differential capacitance reference value and then ensuring the accuracy of wearing detection of the earphone.

The behavior state of the device with double-layer capacitive sensors in the embodiment of the present application is determined by using the differential capacitance reference value, without using the previous behavior state of the device, thereby avoiding continued misjudgment on the state of the device due to the previous misjudgment and ensuring the accuracy of behavior state detection of the device.

In a second aspect, an apparatus for determining a capacitance reference is provided, applied to a device with double-layer capacitive sensors, the apparatus including: an obtaining module, configured to obtain a first differential capacitance value of the double-layer capacitive sensors, the first differential capacitance value being a minimum differential capacitance value obtained when the device is out of a box, and the box being a matching device paired with the device and used to receive the device; and a processing module, configured to determine a latest differential capacitance reference value according to the first differential capacitance value and a differential capacitance reference value.

In a possible implementation, the obtaining module is further configured to: obtain a second differential capacitance value of the double-layer capacitive sensors when the device is in the box, and determine whether the device is abnormal according to the second differential capacitance value and the first differential capacitance value; and when it is determined that the device is not abnormal, determine the latest differential capacitance reference value by a preset calibration method according to the first differential capacitance value and the differential capacitance reference value.

In a possible implementation, the first differential capacitance value is a minimum differential capacitance value obtained within a time before the device is in the box.

In a possible implementation, the processing module is specifically configured to: when the first differential capacitance value is less than or equal to the second differential capacitance value, determine that the device is not abnormal; or, when the first differential capacitance value is greater than the second differential capacitance value, determine that the device is abnormal.

In a possible implementation, the processing module is specifically configured to: when the device is out of the box and the ear, determine, according to the first differential capacitance value and the differential capacitance reference value, whether the differential capacitance reference value needs to be calibrated.

In a possible implementation, the first differential capacitance value is a minimum differential capacitance value obtained within a preset time period when the device is out of the device box; if calibration is needed, the differential capacitance reference value calibrated by the preset calibration method is used as the latest differential capacitance reference value; or if calibration is not needed, the differential capacitance reference value is used as the latest differential capacitance reference value.

In a possible implementation, the processing module is specifically configured to: when the absolute value of the difference between the first differential capacitance value and the differential capacitance reference value is greater than a preset first threshold, determine to calibrate the differential capacitance reference value; or, when the absolute value of the difference between the first differential capacitance value and the differential capacitance reference value is less than or equal to the preset first threshold, determine not to calibrate the differential capacitance reference value, the first threshold being used to indicate that the double-layer capacitive sensors are in an abnormal state.

In a possible implementation, the processing module is further configured to: if the first differential capacitance value is greater than the differential capacitance reference value, determine the calibrated differential capacitance reference value as: $c(ref)_{calibrated}=c(ref)+(c(min)-c(ref))*k_1$; or, if the first differential capacitance value is less than the differential capacitance reference value, determine the calibrated differential capacitance reference value as: $c(ref)_{calibrated}=c(ref)+(c(min)-c(ref))*k_2$, where c(ref) is the differential capacitance reference value, $c(ref)_{calibrated}$ is an the calibrated differential capacitance reference value, c(min) is the first differential capacitance value, $k_1$ and $k_2$ are calibration coefficients, $k_1$ is greater than or equal to 0 and less than 1, and $k_2$ is greater than or equal to 0 and less than 1. In a third aspect, a device is provided, the device including: double-layer sensors, and an apparatus for determining a capacitance reference according to the second aspect or any possible implementation of the second aspect.

In a possible implementation, the device is a wireless earphone, and the box is an earphone box matching the earphone.

In a fourth aspect, a chip is provided, the chip includes a processor and a memory, the memory is configured to store a computer program, and the processor is configured to call and run the computer program stored in the memory to execute the method according to the first aspect or any possible implementation of the first aspect.

In a fifth aspect, a computer-readable storage medium is provided, including computer instructions which, when running on an electronic device, cause the electronic device to execute the method according to the first aspect or any possible implementation of the first aspect.

In a sixth aspect, a computer program product is provided, including a computer program which, when running on an electronic device, causes the electronic device to execute the method according to the first aspect or any possible implementation of the first aspect.

DETAILED DESCRIPTION

The technical solutions in the embodiments of the present application will be described below in conjunction with the accompanying drawings.

In a wearable device, such as a Bluetooth earphone, a smart watch, or a smart phone, a capacitance detection solution is usually used to detect user's behavior state of the wearable device, such as touching or approaching. For ease of description, a Bluetooth earphone equipped with capacitive sensors is taken as an example below to describe a method and apparatus for calibrating a capacitance reference according to the embodiments of the present application.

Figure 1:
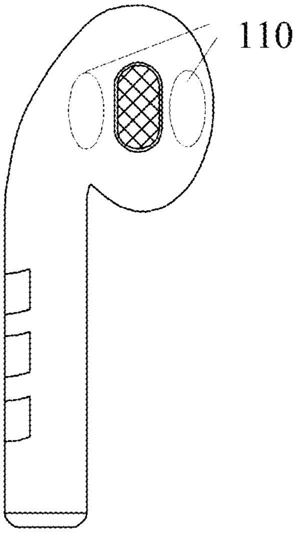
FIG. 1 is an overall appearance diagram of a wireless earphone.

An earphone with built-in capacitive sensors 110 shown in FIG. 1 can detect, through a micro-capacitance detection technology, the change in capacitance when the earphone is close to the ear, to determine whether the user is currently wearing the earphone.

The current capacitance detection solution is mainly a single-layer sensor solution. In the single-layer sensor solution, the wearing state of the earphone can be determined by detecting the capacitance C of the sensor in real time and calculating a relative change of the capacitance C. Specifically, the wearing state of the earphone may be determined through a human ear signal signal_deta=C(t)−C(t−n), where C(t) represents a capacitance value of the sensor at the current time t, and C(t−n) represents a capacitance value of the sensor at the previous time t−n. The obtained human ear signal signal_deta is compared with a preset threshold to determine the current wearing action or falling action of the earphone, and then based on the earphone state at the previous moment and the detected real-time action, the earphone state is switched, that is, in-ear or out-ear state. However, in the single-layer sensor solution, if the initial state is misjudged, or a certain action detection error occurs in the midway, the earphone detection result will continue to be wrong. At this time, the earphone must be powered on again to restore.

Figure 2:
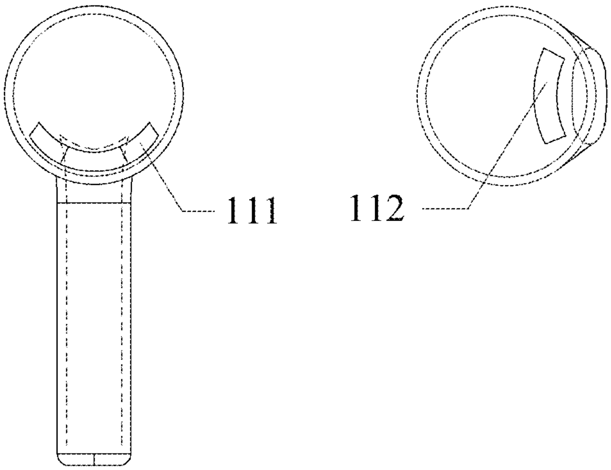
FIG. 2 is a layout diagram of capacitive sensors on the earphone.
Figure 3:
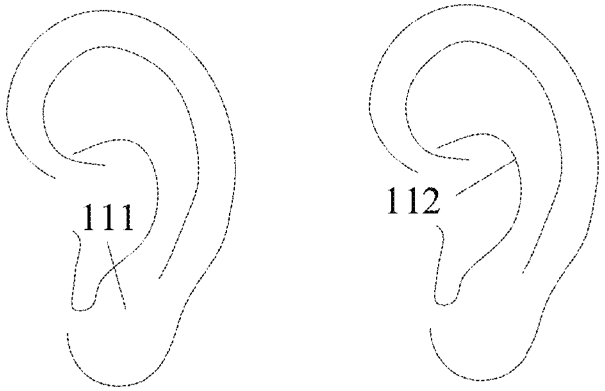
FIG. 3 is a schematic diagram of contact positions between the capacitive sensors of the earphone and the ear.

FIGS. 2 and 3 show schematic diagrams of an earphone with double-layer sensors, where the double-layer means that two sensors have a spatial relationship of upper and lower layers. Compared with a single capacitive sensor, the double-layer capacitive sensors can improve the accuracy of wearing detection and reduce unintended touches. For example, when the earphone is placed on a table, the single sensor may determine that the earphone is in a wearing state, but the double-layer sensors can reduce unintended triggers. For example, a differential capacitance value can remove the influence of temperature drift, thereby improving the accuracy of wearing detection. Specifically, the sensor 111 close to the human ear may be defined as a positive electrode, which includes a positive electrode base capacitance, a capacitance caused by the human ear, and a temperature drift capacitance; and the sensor 112 close to the inside of the earphone may be defined as a negative electrode, which includes a negative electrode base capacitance and a temperature drift capacitance.

Figure 4:
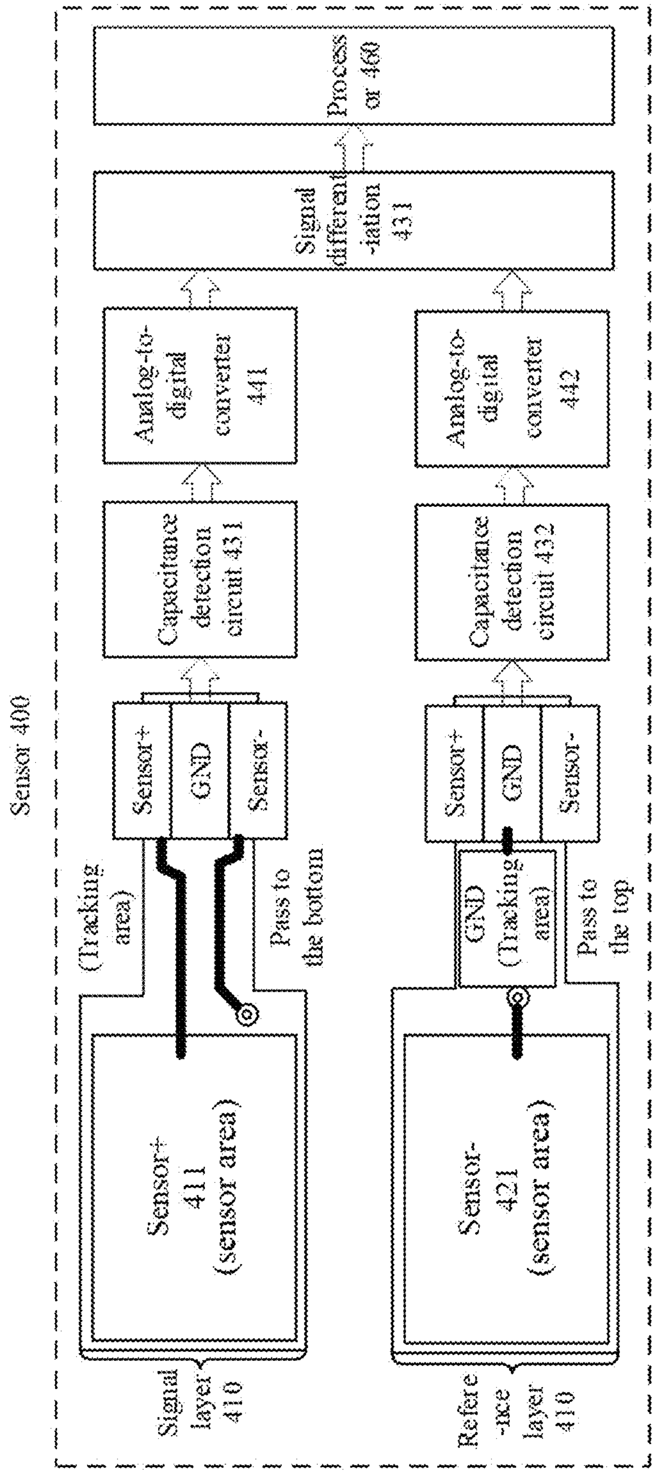
FIG. 4 is a schematic diagram of a detection principle of a double-layer sensor solution.

FIG. 4 shows a schematic diagram of a detection principle of a double-layer sensor solution. As shown in FIG. 4, capacitive sensors 400 include a positive electrode sensor 411 as a signal layer 410 and a negative electrode sensor 421 as a reference layer 420. When the earphone is close to the ear, the capacitance of the positive electrode sensor will change, and the positive electrode sensor outputs a corresponding detection signal to a capacitance detection circuit 431. After the capacitance detection circuit detects the received detection signal, the detection signal undergoes analog-to-digital conversion in an analog-to-digital converter 441. Meanwhile, the negative electrode sensor 421 also detects the change in capacitance in real time, and outputs the detection signal to a capacitance detection circuit 432, and then the detection signal undergoes analog-to-digital conversion in an analog-to-digital converter 442. Further, a signal differentiation is performed with respect to the detection signals from the positive electrode sensor 411 and the negative electrode sensor 421 after the analog-to-digital conversion, then a differential signal from the signal differentiation is inputted to a processor 460, and finally a real-time differential capacitance value of the double-layer capacitive sensors can be obtained. Specifically, the real-time differential capacitance value of the positive and negative electrode sensors (the positive electrode sensor 411 and the negative electrode sensor 421) may be defined as C(t). Under normal circumstances when no external conductor approaches, the temperature drift capacitances in the positive and negative electrode sensors can cancel each other. In addition, because no external conductor approaches, the positive electrode will not produce a capacitance change caused by any conductor. Therefore, the base differential capacitance of the positive and negative electrode sensors may be defined as a differential capacitance reference value C(ref). On the other hand, when an external conductor approaches, the capacitance of the positive electrode sensor will change. At this time, the measured real-time differential capacitance value is determined by the capacitance caused by the external conductor and the base capacitances of the positive and negative electrodes together.

Figure 5:
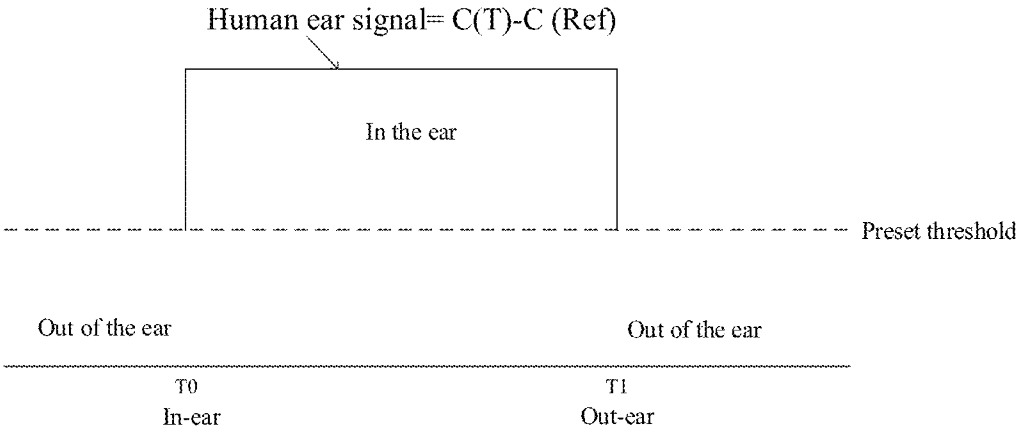
FIG. 5 is a schematic diagram of a principle of determining a wearing state.

Further, the current wearing state of the earphone may be determined according to the real-time differential capacitance value C(t) and the differential capacitance reference value C(ref). Specifically, a human ear signal signal_deta=C(t)−C(ref) may be obtained, and then the current wearing state of the earphone may be determined according to the human ear signal and a preset threshold. It should be understood that the specific process of detecting the differential capacitance of the double-layer sensors by using the capacitance detection circuits can refer to the prior art, and details are not described in the embodiments of the present application. FIG. 5 shows a schematic diagram of a principle of determining a wearing state of an earphone by means of human ear signals and a preset threshold. As shown in FIG. 5, at time T0, the earphone is in the ear, the human ear signal signal_deta=C(t)−C(ref) obtained at this time is greater than the preset threshold, and it is thus determined that the wearing state is in the ear. After the time T1, the earphone is out of the ear, the tested human ear signal signal_deta (that is, the change in capacitance signal)=C(t)−C(ref) is less than the preset threshold, and it is thus determined that the wearing state is out of the ear.

In the double-layer sensor solution, C(ref) is used as the differential capacitance reference value to determine the real-time wearing state of the earphone. However, in the above double-layer sensor solution, the accuracy of the differential capacitance reference value C(ref) is an important factor for obtaining an accurate wearing state result. In practical applications, the differential capacitance reference value C(ref) can remain unchanged in a short time, but in a long term, with the change of sensor materials and the influence of external environment (such as earphone shell material, sensor aging, or earphone drop, and climate change), the actual value of the differential capacitance reference value C(ref) may change. Therefore, if the C(ref) is not updated according to the actual status of the earphone, the detected wearing result may be inaccurate. Similarly, other subsequent judgment and control based on the capacitance change detected by the capacitive sensors are also not accurate.

To this end, an embodiment of the present application provides a method for determining a capacitance reference, which tracks a differential capacitance value for a long time during the use of an earphone, and adaptively updates a differential capacitance reference value, thereby ensuring the accuracy of the differential capacitance reference value and then ensuring the accuracy of detection of the change in the differential capacitance.

Figure 6:
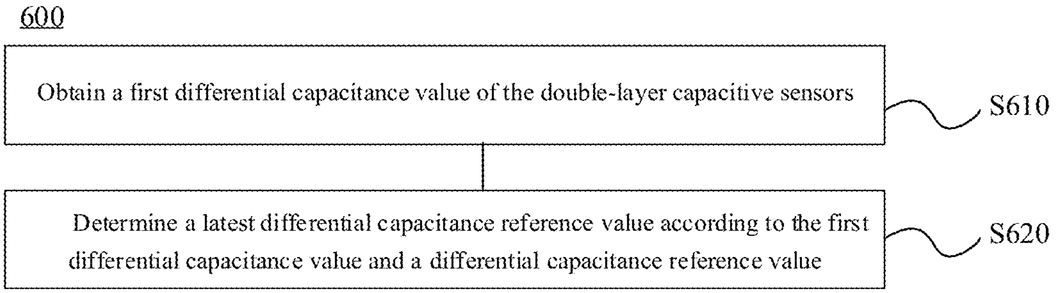
FIG. 6 is a schematic flowchart of a method for determining a capacitance reference according to an embodiment of the present application.

FIG. 6 shows a schematic flowchart of a method 600 for determining a capacitance reference according to an embodiment of the present application. The method shown in FIG. 6 may be executed by a chip in a device, and the device may have double-layer capacitive sensors. As shown in FIG. 6, the method 600 may include some or all of the following steps.

For ease of understanding, when the device in the embodiments of the present application is described, an earphone is taken as an example. With regard to the behavior state of the device detected according to the capacitance change in the present application, the wearing state in the earphone is taken as an example, but the present application is not limited thereto. For example, in addition to the wearing detection of the earphone, the embodiments of the present application may also be applied to, for example, behavior state detection of a smart watch, a smart phone, etc.

S610, a first differential capacitance value of the double-layer capacitive sensors is obtained.

The first differential capacitance value is a minimum differential capacitance value obtained when the device is out of a box, and the box is a matching device paired with the device and used to receive the device.

It should be understood that the box in the embodiment of the present application is a box matching the device. For example, when the device is an earphone, the box may be an earphone box matching the earphone.

S620, a latest differential capacitance reference value is determined according to the first differential capacitance value and a differential capacitance reference value.

Optionally, the differential capacitance reference value may be a differential capacitance value obtained from the earphone in an idle state (that is, no external conductor approaches the earphone) before delivery, or a differential capacitance value after calibration during the use of the earphone, or a differential capacitance reference value when the earphone is just powered on.

It should be understood that, during the use of the earphone, the actual differential capacitance reference value may slowly change due to the aging of earphone shell materials or sensors, or the earphone drop or climate change. However, the change in differential capacitance reference value is not considered in the existing double-layer capacitive sensor earphone. In this embodiment, the minimum differential capacitance value of the earphone out of the box is obtained, and the latest differential capacitance reference value is determined according to the comparison of the obtained minimum differential capacitance value with the differential capacitance reference value, which can avoid the problem of inaccurate wearing detection results due to the change in the actual differential capacitance reference value of the earphone. Under normal circumstances, if no external conductor approaches, the minimum differential capacitance obtained in this embodiment may be a differential capacitance in the idle state. Therefore, if the differential capacitance reference value of the earphone due to material aging and external influencing factors, the minimum differential capacitance value obtained out of the earphone box should be the same as the differential capacitance reference value. That is, the essence of this embodiment lies in determining whether to calibrate the differential capacitance reference value according to the two differential capacitance values if no external conductor approaches the earphone.

It should be understood that the first differential capacitance value in this embodiment may be obtained by collecting multiple differential capacitances of the double-layer sensors at different times according to a preset sampling period, and then selecting a minimum value from the multiple differential capacitance values collected.

Figure 7:
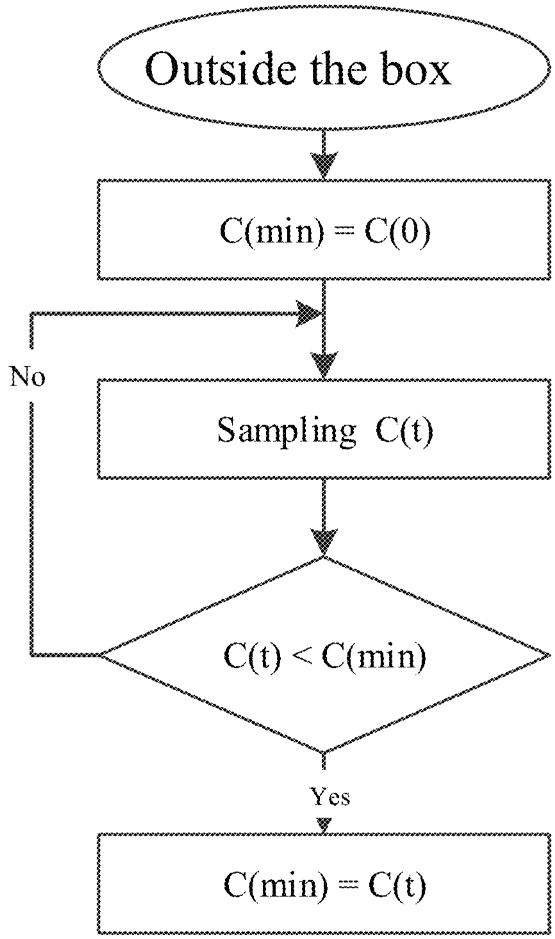
FIG. 7 is a schematic diagram of a process out of a box according to an embodiment of the present application.

FIG. 7 shows a schematic diagram of a process for obtaining a first differential capacitance value according to an embodiment of the present application. As shown in FIG. 7, a differential capacitance C(0) of the double-layer sensors at time t0 may be first obtained and recorded as C(min), then a real-time differential capacitance value of the double-layer sensors may be sampled according to a preset sampling period (for example, every 1 s or 1 min, which is not limited by the present application and may be selected according to the actual situation), the sampling result is recorded as C(t) (where t may be any natural number), and the C(t) is compared with the C(min); if the C(t) is greater than the C(min), the sampling continues; if the C(t) is less than the C(min), the current C(t) is updated to the C(min), and the process is repeated until a calibration process.

Optionally, after the sampling, the process of determining the latest differential capacitance reference value may be performed out of the earphone box or inside the earphone box.

Figure 8:
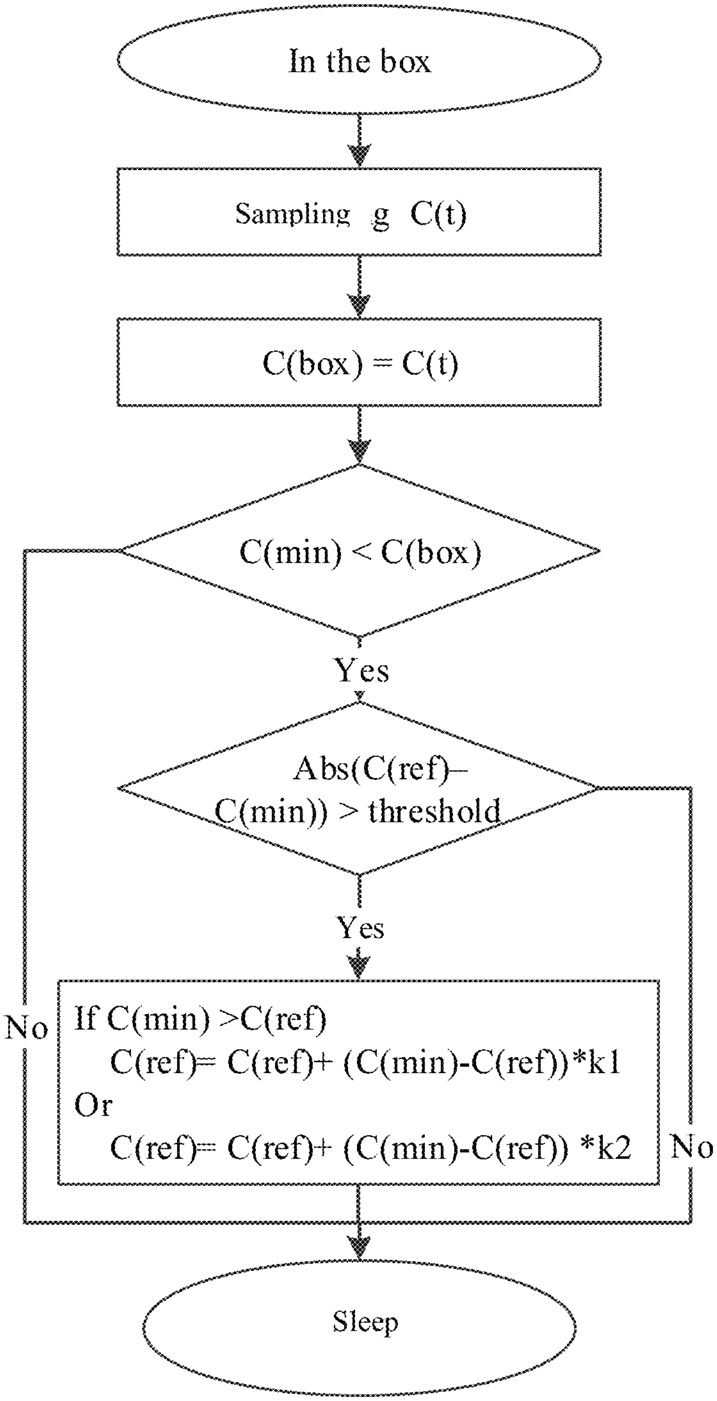
FIG. 8 is a schematic diagram of a process of determining a latest differential capacitance reference value in the box according to an embodiment of the present application.

FIG. 8 shows a schematic flowchart of a process for determining the latest differential capacitance reference value for the device in the box. As shown in FIG. 8, after the device is placed in the box, a second differential capacitance value may be first collected and recorded as C(box). This C(box) may include a capacitance caused by the box and a differential capacitance reference value. Specifically, the method further includes: a second differential capacitance value of the double-layer capacitive sensors when the device is in the box is obtained.

It should be understood that when the earphone is in the earphone box to determine the latest differential capacitance reference value, the first differential capacitance obtained in FIG. 7 is a minimum value differential capacitance value obtained during a period of time when the earphone is taken out of the earphone box and then placed in the earphone box.

Further, whether the earphone is abnormal is determined according to the second differential capacitance value and the first differential capacitance value obtained in FIG. 7. Specifically, when the first differential capacitance value is less than or equal to the second differential capacitance value, it is determined that the earphone is not abnormal; or, when the first differential capacitance value is greater than the second differential capacitance value, it is determined that the device is abnormal. It should be understood that, when the first differential capacitance value is greater than the second differential capacitance value, it indicates that the first differential capacitance value may include a capacitance signal of an external conductor. In this case, the differential capacitance reference value cannot be calibrated. Therefore, if it is determined that the earphone is currently abnormal, the calibration may be given up (that is, the differential capacitance reference value will not be updated). On the other hand, if the first differential capacitance value is less than or equal to the second differential capacitance value, that is, when it is determined that the earphone is not abnormal, whether the differential capacitance reference needs to be calibrated is further determined. Specifically, when it is determined that the earphone is not abnormal, the latest differential capacitance reference value may be determined by a preset calibration method according to the first differential capacitance value and the differential capacitance reference value.

In the embodiment of the present application, whether the device is abnormal is determined using the second differential capacitance value in the earphone box, and whether to calibrate the capacitance reference value of the device is further determined according to the abnormality determination state. Based on the constraints of multiple boundary conditions, the calibration can be further screened, which can provide a more accurate capacitance reference value, improve the accuracy of detection of the capacitance change, and ensure the accuracy of behavior state detection of the device.

The following steps are the process of further determining whether to calibrate the differential capacitance reference value according to the first differential capacitance value and the differential capacitance reference value, and determining the latest differential capacitance reference value.

Specifically, determining the latest differential capacitance reference value according to the first differential capacitance value and the differential capacitance reference value may include: when the absolute value of the difference between the first differential capacitance value and the differential capacitance reference value is greater than a preset first threshold, determining to calibrate the differential capacitance reference value; or, when the absolute value of the difference between the first differential capacitance value and the differential capacitance reference value is less than or equal to the preset first threshold, determining not to calibrate the differential capacitance reference value, the first threshold being used to indicate that the double-layer capacitive sensors are in an abnormal state.

Optionally, the first threshold may be a pre-configured threshold obtained based on an empirical value, for example, the threshold may be 10, 20, etc., which is not limited by the embodiment of the present application and may be adjusted and configured according to actual conditions.

Further, the preset calibration method includes: if the first differential capacitance value is greater than the differential capacitance reference value, determining the calibrated differential capacitance reference value as: $c(ref)_{calibrated}=c(ref)+(c(min)-c(ref))*k_1$; or, if the first differential capacitance value is less than the differential capacitance reference value, determining the calibrated differential capacitance reference value as: $c(ref)_{calibrated}=c(ref)+(c(min)-c(ref))*k_2$, where c(ref) is the differential capacitance reference value, $c(ref)_{calibrated}$ is the calibrated differential capacitance reference value, c(min) is the first differential capacitance value, $k_1$ and $k_2$ are calibration coefficients, $k_1$ is greater than or equal to 0 and less than 1, and $k_2$ is greater than or equal to 0 and less than 1.

After the differential capacitance reference value is calibrated according to different calibration coefficients, the earphone may enter a sleep state. Specifically, software may determine to select which K value according to the relationship between c(min) and c(ref). When the difference between c(min) and c(ref) is relatively large, the self-learning is relatively fast, that is, the present application can be embodied by different K, and can better adaptively adjust the reference by selecting different K values.

It should be understood that, in the embodiment of the present application, when the earphone is in the earphone box, if it is determined that the differential capacitance reference value of the earphone does not need to be calibrated, the earphone can then enter the sleep state.

Optionally, $k_1$ and $k_2$ may be the same value, and the calibrated differential capacitance reference values are the same when the first differential capacitance is greater than or less than the differential capacitance reference value; or $k_1$ and $k_2$ may also be different values, and different calibration values may be obtained according to the relationship between the first differential capacitance value and the differential capacitance reference value. The present application does not limit the relationship between $k_1$ and $k_2$. Preferably, if the difference between the first differential capacitance value and the differential capacitance reference value is relatively large, a relatively large calibration coefficient K may be used to accelerate the calibration process. For example, if the first differential capacitance value is greater than the differential capacitance reference value so that $k_1$ is greater than $k_2$, a more accurate latest differential capacitance reference value can be obtained faster according to $c(ref)_{calibrated}=c(ref)+(c(min)-c(rep)*k_1$.

Figure 9:
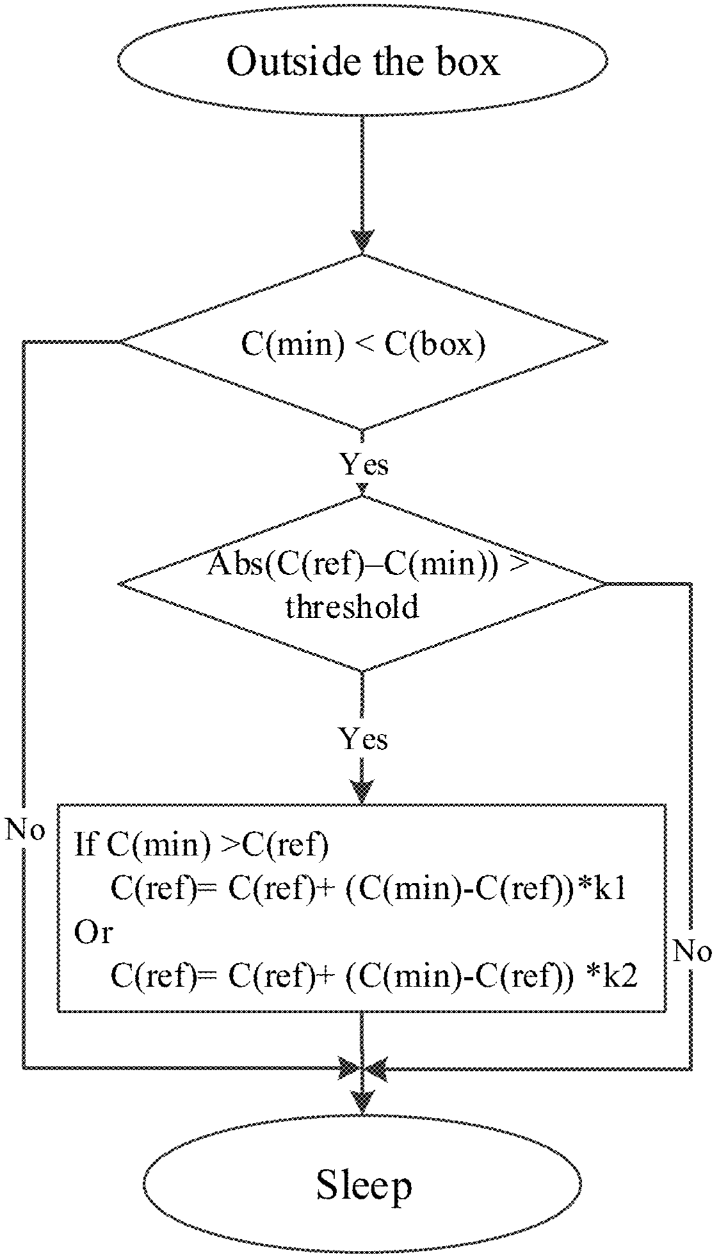
FIG. 9 is a schematic diagram of a process of determining a latest differential capacitance reference value out of the box according to an embodiment of the present application.

In addition to the process of determining the latest differential capacitance reference value when the device is in the box as shown in FIG. 8, an embodiment of the present application further provides a schematic diagram of a process of determining the latest differential capacitance reference value when the device is out of the box as shown in FIG. 9.

The difference from the process in the box in FIG. 8 lies in that, after the first differential capacitance value is obtained, the device is not placed in the box to determine the latest differential capacitance reference value, but the box is out of the box to determine the latest differential capacitance reference value, specifically, determining the latest differential capacitance reference value according to the first differential capacitance value and the differential capacitance reference value includes: when the device is out of the box and the ear, determining, according to the first differential capacitance value and the differential capacitance reference value, whether the differential capacitance reference value needs to be calibrated; if the differential capacitance reference value needs to be calibrated, using the differential capacitance reference value calibrated by the preset calibration method as the latest differential capacitance reference value; and if the differential capacitance reference value does not need to be calibrated, using the differential capacitance reference value as the latest differential capacitance reference value.

It should be understood that, when the earphone is out of the box to calibrate the differential capacitance reference value, the earphone may be in the ear; when the earphone is in the ear, the detected first differential capacitance value necessarily includes a capacitance change caused by the ear (that is, an external conductor), so the calibration of the differential capacitance reference value at this time is meaningless; therefore, when the earphone is in the ear, the differential capacitance reference value will not be calibrated, that is, whether to calibrate the differential capacitance reference value is determined only when the earphone is in the box and out of the ear.

It should be understood that, the earphone and the matching earphone box in the embodiment of the present application may be provided with corresponding terminals capable of detecting whether the earphone is in the box. Further, a chip for wearing detection in the earphone may receive a message about whether the earphone is in the box, which is detected by a master control of the earphone, and then the chip for wearing detection may perform corresponding processing according to the message.

It should be understood that, when the earphone is out of the earphone box to determine the latest differential capacitance reference value, the first differential capacitance value is obtained in FIG. 7 within a preset time period. Specifically, the first differential capacitance value is a minimum differential capacitance value obtained within the preset time period when the device is out of the box. A real-time differential capacitance value may be collected according to a preset sampling period within the preset time period. For example, sampling is performed every 1 min according to the preset sampling period to determine the first differential capacitance value within the preset time period of 1 h. The specific sampling process may refer to the description in FIG. 7, and details are not described herein again.

In the embodiment of the present application, the differential capacitance reference value of the device out of the box can be timely detected and calibrated, thereby avoiding error detection results of the behavior state of the device and further improving the user experience.

Further, whether the differential capacitance reference value needs to be calibrated is determined according to the first differential capacitance value and the differential capacitance reference value. The process of determining whether the differential capacitance reference value needs to be calibrated is the same as the corresponding process in FIG. 8, so details are not described herein again.

It should be understood that, if the earphone is in the ear for sampling within the above-mentioned preset time period, the calibration can be directly given up after it is determined that the wearing state of the earphone is in the ear, and sampling is performed within a next preset time period. For example, if the preset time period is 1 h, the earphone obtains the minimum differential capacitance value (that is, the first differential capacitance value) with the 1 h, and it is determined that the earphone is in the ear, the earphone determines to directly give up the calibration of the differential capacitance reference value, and enters the next time period to start the process of determining a minimum differential capacitance value within the next time period.

In this embodiment, in order to determine the wearing state of the earphone, the following steps may be performed: obtaining a third differential capacitance value, the third differential capacitance value being a capacitance value obtained when the earphone is out of the earphone box; and determining whether the earphone is in the ear or out of the ear according to the third differential capacitance value, the differential capacitance reference value, and a preset second threshold. It should be understood that, the third differential capacitance value may be a differential capacitance value obtained at any time when the earphone is out of the box. Further, the wearing state of the earphone may be determined according to the relationship between the human ear signal signal_deta=C(t)−C(ref) and the second threshold. The specific determining process is shown in FIG. 5, and details are not described herein again.

It should be understood that, when the earphone is out of the earphone box to determine the latest differential capacitance reference value, compared with the processing in the earphone box in FIG. 8, the C(box) does not need to be obtained when the earphone is out of the box, and the first differential capacitance value is compared with the C(box); alternatively, when the earphone is out of the box, a differential capacitance reference value may also be pre-configured, the first differential capacitance value is first compared with the pre-configured differential capacitance reference value to determine whether the earphone is in an abnormal state, and then the latest differential capacitance reference value is determined according to the first differential capacitance value and the differential capacitance reference value.

It should be understood that, in the embodiment of the present application, when the earphone is out of the box to determine the latest differential capacitance reference value, a certain time interval may be set after each preset time period, so that the earphone can compare the relationship between the obtained first differential capacitance value and the differential capacitance reference value or the second differential capacitance value within the time interval to determine whether to calibrate the differential capacitance reference value, and determine the latest differential capacitance reference value after determining to calibrate; alternatively, the determining and calibrating processes may also be performed synchronously with the differential capacitance sampling process, which is not limited in the embodiment of the present application.

Figure 10:
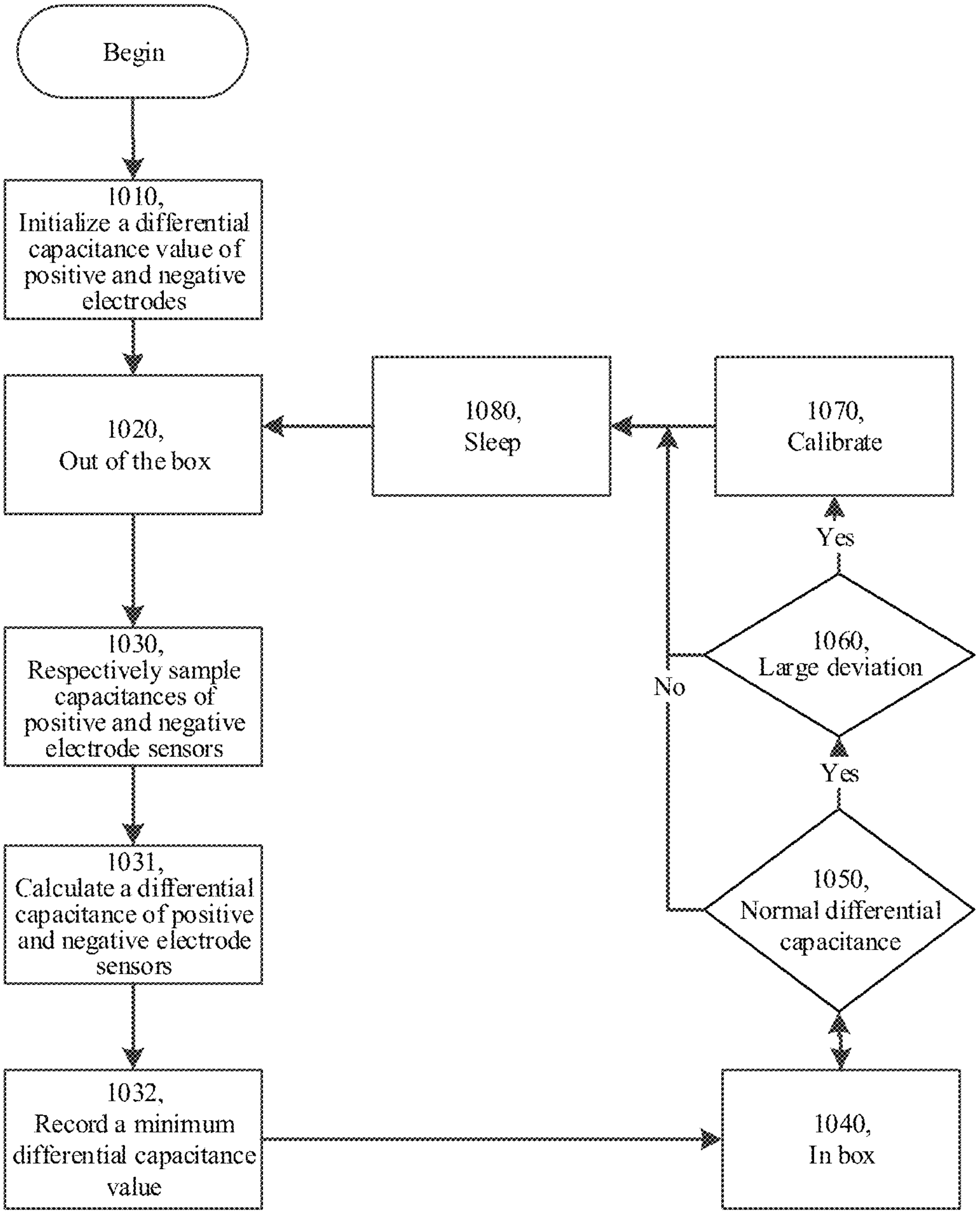
FIG. 10 is a schematic flowchart of a process of determining a capacitance reference according to an embodiment of the present application.

FIG. 10 is a schematic flowchart of a process of determining a capacitance reference according to an embodiment of the present application. In the embodiment of the present application, the device including double-layer capacitive sensors is an earphone as an example for description, but the embodiment of the present application is not limited thereto.

As shown in FIG. 10, the process may include: 1010, when the earphone is delivered from the factory, a differential capacitance reference value of positive and negative electrodes is initially calibrated. Specifically, a differential capacitance value of the positive and negative electrodes may be obtained as the reference value when no external conductor touches.

1020, the earphone is taken out of a box.

1030, capacitance values of positive and negative electrode sensors are collected out of the box, a real-time differential capacitance value is obtained according to the capacitance values of the positive and negative electrode sensors (step 1031), and then a minimum differential capacitance value is recorded (step 1032).

1040, the earphone is put into the box.

1050, whether the current minimum differential capacitance value recorded out of the box is abnormal is determined; if the minimum value is abnormal, calibration is directly given up (that is, a latest differential capacitance reference value does not need to be determined), and the earphone enters a sleep state; or if the minimum value is normal, it is determined that the differential capacitance reference value may need to be calibrated, that is, a latest differential capacitor reference value needs to be determined, and then next step is performed. Specifically, the differential capacitance value C(box) obtained inside the box may be compared with the minimum differential capacitance value; if the minimum differential capacitance value is greater than the C(box), it is determined that the earphone is in an abnormal state; or if the minimum differential capacitance value is less than the C(box), it is determined that the earphone is in a normal state.

1060, a deviation between the current minimum differential capacitance value recorded out of the box and a differential capacitance reference value stored in the system is determined; if the deviation is relatively small, calibration is not needed, and the earphone can directly give up the calibration and enter a sleep state (step 1080); or if the deviation is relatively large, calibration may be needed, and next step is going to be performed. Specifically, the absolute value of the deviation between the minimum differential capacitance value and the differential capacitance reference value may be compared with a preset threshold; if the absolute value of the deviation is greater than the preset threshold, calibration may be needed; or if the absolute value of the deviation is less than the preset threshold, calibration is not needed (that is, the current differential capacitance reference value is still used as the latest differential capacitance reference value).

1070, the current minimum differential capacitance value recorded out of the box is compared with the differential capacitance reference value for their relationship, and a different calibration coefficient is selected according to the relationship to calibrate the differential capacitance reference value (that is, to determine the latest differential capacitance reference value).

1080, the earphone enters a sleep state after calibration.

It should be understood that the sleep state in this embodiment is a state after the earphone is placed in the box.

An embodiment of the present application further provides an apparatus for determining a capacitance reference, which may be applied to a device with double-layer capacitive sensors, and the determining apparatus may be a chip in the device or the like. The determining apparatus may execute the method for determining a capacitance reference in any of the foregoing embodiments. Detailed description of the determining apparatus may refer to the description of the foregoing method for determining a capacitance reference.

Figure 11:
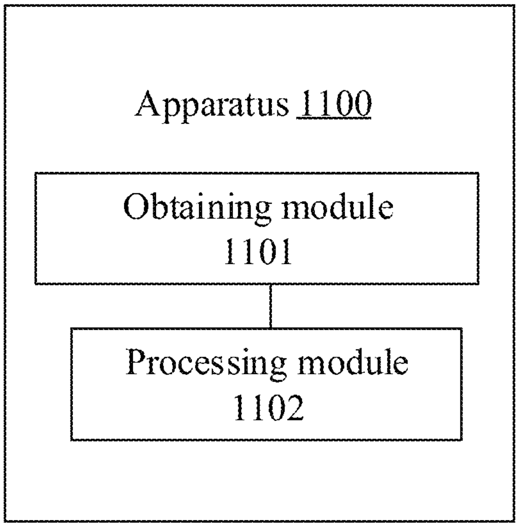
FIG. 11 is a schematic diagram of an apparatus for determining a capacitance reference according to an embodiment of the present application.

As shown in FIG. 11, the apparatus for determining a capacitance reference includes an obtaining module 1101 and a processing module 1102, wherein the obtaining module 1101 is configured to obtain a first differential capacitance value of the double-layer capacitive sensors, the first differential capacitance value being a minimum differential capacitance value obtained when the device is out of an earphone box, and the box being a matching device paired with the device and used to receive the device; and the processing module 1102 is configured to determine a latest differential capacitance reference value according to the first differential capacitance value and a differential capacitance reference value.

Optionally, in an implementation, the obtaining module 1101 is further configured to: obtain a second differential capacitance value of the double-layer capacitive sensors when the device is in the box, and determine whether the earphone is abnormal according to the second differential capacitance value and the first differential capacitance value; and when it is determined that the device is not abnormal, determine the latest differential capacitance reference value by a preset calibration method according to the first differential capacitance value and the differential capacitance reference value.

Optionally, in an implementation, the first differential capacitance value is a minimum differential capacitance value obtained within a time before the device is placed in the box.

Optionally, in an implementation, the processing module 1102 is specifically configured to: when the first differential capacitance value is less than or equal to the second differential capacitance value, determine that the device is not abnormal; or, when the first differential capacitance value is greater than the second differential capacitance value, determine that the device is abnormal.

Optionally, in an implementation, the processing module 1102 is specifically configured to: when the device is out of the box and the ear, determine, according to the first differential capacitance value and the differential capacitance reference value, whether the differential capacitance reference value needs to be calibrated; if the differential capacitance reference value needs to be calibrated, use the differential capacitance reference value calibrated by the preset calibration method as the latest differential capacitance reference value; or if the differential capacitance reference value does not need to be calibrated, use the differential capacitance reference value as the latest differential capacitance reference value.

Optionally, in an implementation, the processing module 1102 is specifically configured to: when the absolute value of the difference between the first differential capacitance value and the differential capacitance reference value is greater than a preset first threshold, determine to calibrate the differential capacitance reference value; or, when the absolute value of the difference between the first differential capacitance value and the differential capacitance reference value is less than or equal to the preset first threshold, determine not to calibrate the differential capacitance reference value, the first threshold being used to indicate that the double-layer capacitive sensors are in an abnormal state.

Optionally, in an implementation, the processing module 1102 is further configured to: if the first differential capacitance value is greater than the differential capacitance reference value, determine the calibrated differential capacitance reference value as: $c(ref)_{calibrated}=c(ref)+(c(min)-c(ref))*k_1$; or, if the first differential capacitance value is less than the differential capacitance reference value, determine the calibrated differential capacitance reference value as: $c(ref)_{calibrated}=c(ref)+(c(min)-c(ref))*k_2$, where c(ref) is the differential capacitance reference value, $c(ref)_{calibrated}$ is an the calibrated differential capacitance reference value, c(min) is the first differential capacitance value, $k_1$ and $k_2$ are calibration coefficients, $k_1$ is greater than or equal to 0 and less than 1, and $k_2$ is greater than or equal to 0 and less than 1.

An embodiment of the present application further provides a device, including the apparatus for determining a capacitance reference described in any of the foregoing embodiments, and double-layer capacitive sensors.

Optionally, the device may be a wireless earphone, and the box is an earphone box matching the earphone.

Figure 12:
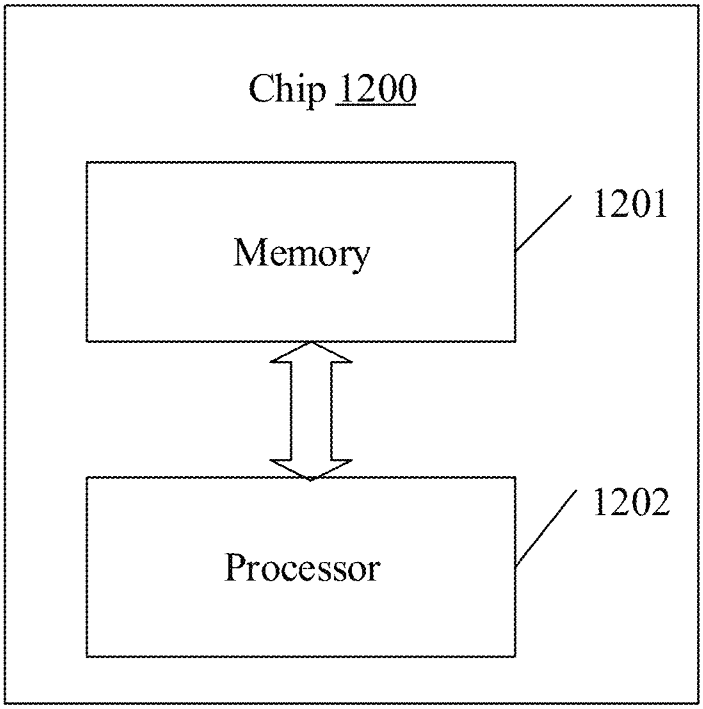
FIG. 12 is a schematic structural diagram of a chip according to an embodiment of the present application.

FIG. 12 is a schematic structural diagram of a chip 1200 according to an embodiment of the present application. The chip 1200 shown in FIG. 12 includes a memory 1201 and a processor 1202.

The memory 1201 is configured to store executable instructions; and the processor 1202 is configured to call and run the executable instructions in the memory 1201 to implement the method in the embodiments of the present application.

The processor may be an integrated circuit chip with signal processing capability. In the implementation process, each step of the method embodiment may be completed by an integrated logic circuit of hardware in the processor or by an instruction in the form of software. The processor may be a general-purpose processor, a Digital Signal Processor (DSP), an Application Specific Integrated Circuit (ASIC), a Field Programmable Gate Array (FPGA), or other programmable logic device, discrete gate or transistor logic device, or discrete hardware component. The processor may implement or execute the methods, steps, and logical block diagrams disclosed in the embodiments of the present application. The general-purpose processor may be a microprocessor or any conventional processor, etc. The steps of the methods disclosed in the embodiments of the present application may be directly implemented by a hardware decoding processor, or by a combination of hardware and software modules in the decoding processor. The software modules may be located in a storage medium mature in the art, such as a random access memory, a flash memory, a read-only memory, a programmable read-only memory, an electrically erasable programmable memory, or a register. The storage medium is located in a memory, and the processor reads the information in the memory and combines the hardware to complete the steps of the above method.

The memory may be a volatile memory or a non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM) serving as an external cache. By exemplary but not restrictive description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM).

An embodiment of the present application further provides a computer-readable storage medium for storing a computer program. The computer-readable storage medium may be applied to the apparatus in the embodiments of the present application, and the computer program causes the apparatus to execute each method of the embodiments of the present application.

An embodiment of the present application further provides a computer program product, including computer program instructions. The computer program product may be applied to the apparatus in the embodiments of the present application, and the computer program causes the apparatus to execute each method of the embodiments of the present application.

Those of ordinary skill in the art may realize that the units and algorithmic steps of each example described in combination with the embodiments disclosed herein may be implemented by electronic hardware, or a combination of computer software and electronic hardware. Whether these functions are executed by hardware or software depends on a specific application and design constraint conditions of the technical solution. Professionals may implement the described functions for each specific application by using different methods, but such implementation should not be considered beyond the scope of the present application.

Those skilled in the art may clearly understand that, for the sake of convenience and briefness in description, for the specific working processes of the above-described systems, apparatuses and units, reference may be made to the corresponding processes in the embodiments of the aforementioned methods, and details are not described herein again.

In the several embodiments provided in the present application, it should be understood that the disclosed systems, apparatuses and methods may be realized in other ways. For example, the above-described apparatus embodiment is only exemplary. For example, the division of the units is only a logic function division, other division modes may be adopted in practice. For example, a plurality of units or components may be combined or integrated in another system, or some features may be omitted or are not executed. In addition, the displayed or discussed mutual couplings or direct couplings or communication connections may be implemented by some interfaces. The indirect couplings or communication connections between apparatuses or units may be implemented in electronic, mechanical, or other forms.

The units illustrated as separate components may be or may not be physically separated, and the components displayed as units may be or may not be physical units, that is, the components may be positioned at one place or may also be distributed on a plurality of network units. The objectives of the solutions of the embodiments may be fulfilled by selecting part of or all of the units according to actual needs.

In addition, the functional units in the embodiments of the present application may be integrated into one processing unit, or each of the units may exist alone physically, or two or more units may be integrated into one unit.

When the functions are realized in the form of software functional units and sold or used as independent products, the functions may be stored in computer readable storage mediums. Based on such an understanding, the technical solution of the present application substantially, or the part of the present invention making contribution to the prior art, or a part of the technical solution may be embodied in the form of a software product, and the computer software product is stored in a storage medium, which includes a plurality of instructions enabling a computer device (which may be a personal computer, a server, or a network device, etc.) to execute all of or part of the steps in the methods of the embodiments of the present application. The aforementioned storage medium includes: various media capable of storing program codes, such as a U disk, a mobile hard disk, a read-only memory (ROM), a random access memory (RAM), a magnetic disk or optical disk.

Described above are merely specific embodiments of the present application, but the scope of the present application is not limited to this, any skilled who is familiar with this art could readily think of variations or substitutions within the disclosed technical scope of the present application, and these variations or substitutions shall fall within the scope of the present application. Therefore, the protection scope of the present application shall be subject to the protection scope of the claims.

What is claimed is:

1. A method for determining a capacitance reference, applied to a device with double-layer capacitive sensors, the method comprising:

obtaining a first differential capacitance value of the double-layer capacitive sensors, the first differential capacitance value being a minimum differential capacitance value among a plurality of differential capacitance values of the double-layer capacitive sensors obtained according to a preset sampling period within a preset time period when the device is out of a box, and the box being a matching device paired with the device and used to receive the device; and determining a latest differential capacitance reference value according to the first differential capacitance value and a differential capacitance reference value.

2. The method according to claim 1, wherein the method further comprises: obtaining a second differential capacitance value of the double-layer capacitive sensors when the device is in the box, and determining whether the device is abnormal according to the second differential capacitance value and the first differential capacitance value; and when it is determined that the device is not abnormal, determining the latest differential capacitance reference value by a preset calibration method according to the first differential capacitance value and the differential capacitance reference value.

3. The method according to claim 2, wherein the first differential capacitance value is a minimum differential capacitance value obtained within a time before the device is in the box.

4. The method according to claim 2, wherein the determining whether the device is abnormal according to the second differential capacitance value and the first differential capacitance value comprises:

when the first differential capacitance value is less than or equal to the second differential capacitance value, determining that the device is not abnormal; or, when the first differential capacitance value is greater than the second differential capacitance value, determining that the device is abnormal.

5. The method according to claim 1, wherein the determining a latest differential capacitance reference value according to the first differential capacitance value and a differential capacitance reference value comprises:

when the device is out of the box and out of an ear, determining, according to the first differential capacitance value and the differential capacitance reference value, whether the differential capacitance reference value needs to be calibrated; if the differential capacitance reference value needs to be calibrated, using a differential capacitance reference value calibrated by the preset calibration method as the latest differential capacitance reference value; or if the differential capacitance reference value does not need to be calibrated, using the differential capacitance reference value as the latest differential capacitance reference value.

6. The method according to claim 2, wherein the determining the latest differential capacitance reference value according to the first differential capacitance value and the differential capacitance reference value comprises:

when an absolute value of the difference between the first differential capacitance value and the differential capacitance reference value is greater than a preset first threshold, determining to calibrate the differential capacitance reference value; or, when the absolute value of the difference between the first differential capacitance value and the differential capacitance reference value is less than or equal to the preset first threshold, determining not to calibrate the differential capacitance reference value, the first threshold being used to indicate that the double-layer capacitive sensors are in an abnormal state.

7. The method according to claim 6, wherein the preset calibration method comprises:

if the first differential capacitance value is greater than the differential capacitance reference value, determining the calibrated latest differential capacitance reference value as:

$$c(\text{ref})_{calibrated}=c(\text{ref})+(c(\text{min})-c(\text{ref}))*k_1;\text{ or,}$$

if the first differential capacitance value is less than the differential capacitance reference value, determining the calibrated latest differential capacitance reference value as:

$$c(\text{ref})_{calibrated}=c(\text{ref})+(c(\text{min})-c(\text{ref}))*k_2,$$

wherein c(ref) is the differential capacitance reference value, $c(\text{ref})_{calibrated}$ is the calibrated latest differential capacitance reference value, c(min) is the first differential capacitance value, $k_1$ and $k_2$ are calibration coefficients, $k_1$ is greater than or equal to 0 and less than 1, $k_2$ is greater than or equal to 0 and less than 1, and $k_1$ is greater than $k_2$.

8. An apparatus for determining a capacitance reference, applied to a device with double-layer capacitive sensors, the apparatus comprising:

an obtaining module, configured to obtain a first differential capacitance value of the double-layer capacitive sensors, the first differential capacitance value being a minimum differential capacitance value among a plurality of differential capacitance values of the double-layer capacitive sensors obtained according to a preset sampling period within a preset time period when the device is out of a box, and the box being a matching device paired with the device and used to receive the device; and a processing module, configured to determine a latest differential capacitance reference value according to the first differential capacitance value and a differential capacitance reference value.

9. The apparatus according to claim 8, wherein the obtaining module is further configured to:

obtain a second differential capacitance value of the double-layer capacitive sensors when the device is in the box, and determine whether the device is abnormal according to the second differential capacitance value and the first differential capacitance value; and when it is determined that the device is not abnormal, determine the latest differential capacitance reference value by a preset calibration method according to the first differential capacitance value and the differential capacitance reference value.

10. The apparatus according to claim 9, wherein the first differential capacitance value is a minimum differential capacitance value obtained within a time before the device is in the box.

11. The apparatus according to claim 9, wherein the processing module is specifically configured to:

when the first differential capacitance value is less than or equal to the second differential capacitance value, determine that the device is not abnormal; or, when the first differential capacitance value is greater than the second differential capacitance value, determine that the device is abnormal.

12. The apparatus according to claim 8, wherein the processing module is specifically configured to:

when the device is out of the box and out of an ear, determine, according to the first differential capacitance value and the differential capacitance reference value, whether the differential capacitance reference value needs to be calibrated; if the differential capacitance reference value needs to be calibrated, use a differential capacitance reference value calibrated by the preset calibration method as the latest differential capacitance reference value; or if the differential capacitance reference value does not need to be calibrated, use the differential capacitance reference value as the latest differential capacitance reference value.

13. The apparatus according to claim 9, wherein the processing module is specifically configured to:

when an absolute value of the difference between the first differential capacitance value and the differential capacitance reference value is greater than a preset first threshold, determine to calibrate the differential capacitance reference value; or, when the absolute value of the difference between the first differential capacitance value and the differential capacitance reference value is less than or equal to the preset first threshold, determine not to calibrate the differential capacitance reference value, the first threshold being used to indicate that the double-layer capacitive sensors are in an abnormal state.

14. The apparatus according to claim 10, wherein the processing module is specifically configured to:

when an absolute value of the difference between the first differential capacitance value and the differential capacitance reference value is greater than a preset first threshold, determine to calibrate the differential capacitance reference value; or, when the absolute value of the difference between the first differential capacitance value and the differential capacitance reference value is less than or equal to the preset first threshold, determine not to calibrate the differential capacitance reference value, the first threshold being used to indicate that the double-layer capacitive sensors are in an abnormal state.

15. The apparatus according to claim 11, wherein the processing module is specifically configured to:

when an absolute value of the difference between the first differential capacitance value and the differential capacitance reference value is greater than a preset first threshold, determine to calibrate the differential capacitance reference value; or, when the absolute value of the difference between the first differential capacitance value and the differential capacitance reference value is less than or equal to the preset first threshold, determine not to calibrate the differential capacitance reference value, the first threshold being used to indicate that the double-layer capacitive sensors are in an abnormal state.

16. The apparatus according to claim 12, wherein the processing module is specifically configured to:

when an absolute value of the difference between the first differential capacitance value and the differential capacitance reference value is greater than a preset first threshold, determine to calibrate the differential capacitance reference value; or, when the absolute value of the difference between the first differential capacitance value and the differential capacitance reference value is less than or equal to the preset first threshold, determine not to calibrate the differential capacitance reference value, the first threshold being used to indicate that the double-layer capacitive sensors are in an abnormal state.

17. The apparatus according to claim 16, wherein the processing module is further configured to:

if the first differential capacitance value is greater than the differential capacitance reference value, determine the calibrated latest differential capacitance reference value as:

$$c(\text{ref})_{calibrated}=c(\text{ref})+(c(\text{min})-c(\text{ref}))*k_1;\text{ or,}$$

if the first differential capacitance value is less than the differential capacitance reference value, determine the calibrated latest differential capacitance reference value as:

$$c(\text{ref})_{calibrated}=c(\text{ref})+(c(\text{min})-c(\text{ref}))*k_2,$$

wherein c(ref) is the differential capacitance reference value, $c(\text{ref})_{calibrated}$ is the calibrated latest differential capacitance reference value, c(min) is the first differential capacitance value, $k_1$ and $k_2$ are calibration coefficients, $k_1$ is greater than or equal to 0 and less than 1, $k_2$ is greater than or equal to 0 and less than 1, and $k_1$ is greater than $k_2$.

18. A chip, the chip comprises a processor and a memory, the memory is configured to store a computer program, and the processor is configured to implement the computer program stored in the memory to execute the method according to claim 1.

19. A device, comprising:

double-layer sensors; and an apparatus, wherein the apparatus for determining a capacitance reference, applied to a device with double-layer capacitive sensors, the apparatus comprising:

an obtaining module, configured to obtain a first differential capacitance value of the double-layer capacitive sensors, the first differential capacitance value being a minimum differential capacitance value among a plurality of differential capacitance values of the double-layer capacitive sensors obtained according to a preset sampling period within a preset time period when the device is out of a box, and the box being a matching device paired with the device and used to receive the device; and a processing module, configured to determine a latest differential capacitance reference value according to the first differential capacitance value and a differential capacitance reference value.

20. The device according to claim 19, wherein the device is a wireless earphone, and the box is an earphone box matching the earphone.

* * * * *